United States Patent Office 3,366,666
Patented Jan. 30, 1968

3,366,666
6-BROMO-3,4-DIHYDROXYPHENYLALANINES
Jurg Rutschmann, Oberwil, Basel-Land, and Emil Schreier, Basel, Switzerland, assignors to Sandoz Ltd., Basel, Switzerland
No Drawing. Filed Apr. 24, 1964, Ser. No. 362,474
Claims priority, application Switzerland, Apr. 29, 1963, 5,373/63
14 Claims. (Cl. 260—471)

ABSTRACT OF THE DISCLOSURE 6-bromo-3,4-dihydroxyphenylalanines of the formula:

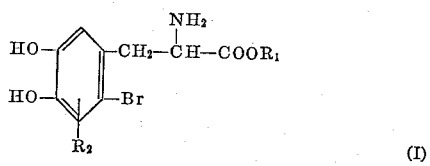

their O,O,N-acyl derivatives and acid addition salts wherein $R_1$ is hydrogen or lower alkyl of 1 to 4 carbon atoms and $R_2$ is hydrogen or bromine, are produced by treating 3,4-dihydroxyphenylalanine with a brominating agent in the presence of a suitable solvent. Optionally, the resulting bromine compound can be esterified with a lower alkanol, esterified and then acylated with a reactive derivative of an organic monocarboxylic acid, or when an acid addition salt is desired, reacting compound I with an organic or inorganic acid. Alternative processes are also disclosed. These alanines and derivatives have a stimulating effect on the central nervous system and a normalizing effect on blood circulation. They are also useful as intermediates for the production of pharmaceuticals.

The present invention relates to new brominated compounds and a process for their production.

The present invention provides brominated 3,4-dihydroxyphenylalanine derivatives of Formula I,

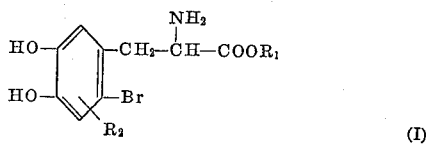

in which $R_1$ signifies a hydrogen atom or a lower alkyl radical, and $R_2$ signifies a hydrogen or a bromine atom, their O,O,N-triacyl derivatives, and their acid addition salts with organic or inorganic acids.

The term "lower" as used herein indicates an alkyl radical or an alkanol with 1 to 4 carbon atoms inclusive.

The present invention further provides a process for the production of Compounds I, their O,O,N-acyl derivatives and acid addition salts which comprises treating 3,4-dihydroxyphenylalanine with elementary bromine or with another brominating agent in the presence of glacial acetic acid or another suitable solvent, optionally esterifying the resulting bromine compound with a lower alkanol, optionally acylating with a reactive derivative of an organic monocarboxylic acid after esterification, or when it is desired to produce an acid addition salt, reacting the resulting Compound I with an organic or inorganic acid; the Compounds I, their O,O,N-acyl derivatives and acid addition salts may alternatively be produced by treating a lower alkyl ester of 3,4-dihydroxyphenylalanine with elementary bromine or another brominating agent in the presence of glacial acetic acid or another suitable solvent, optionally hydrolyzing the resulting brominated ester or optionally acylating with a reactive derivative of an organic monocarboxylic acid or when it is desired to produce an acid addition salt reacting the resulting Compound I with an organic or inorganic acid. The bromination can be effected with elementary bromine or other brominating agents, e.g. pyridine hydrobromide perbromide, N-bromosuccinimide or a mixture of potassium bromate and potassium bromide 1:5. As suitable solvents other than glacial acetic acid, dioxane, chloroform or carbon tetrachloride can be used for the bromination with elementary bromine; for the bromination with pyridine hydrobromide perbromide in addition to the above mentioned solvents, lower alkanols can also be used. The bromination with a mixture of potassium bromate and potassium bromide 1:5 can be effected in glacial acetic acid or aqueous acid solutions.

The only previously known fact about bromination of 3,4-dihydroxyphenylalanine (referred to herein also as "dopa") is that the 2,5,6-tribromo derivative of the L-compound results by the action of bromine vapour on L-dopa; it was impossible to obtain the 2-bromo derivative of the DL-compound by direct bromination of DL-dopa, though it was possible to obtain said 2-bromo derivative by total synthesis in several stages.

The present invention enables Compounds I to be obtained by direct bromination of dopa, for example, by stirring, for several hours at room temperature, a suspension of dopa in glacial acetic acid after the addition of a solution of 1 mol equivalent of bromine in glacial acetic acid, whereby an almost colourless solution gradually results while the bromine is used up. After evaporating the solvent, the free amino acid is liberated from the resulting 6-bromo-dopa hydrobromide by neutralization in the presence of sulphurous acid.

By treatment of 6-bromo-dopa in accordance with the usual methods of esterification with a lower alkanol in the presence of a mineral acid, e.g. at room temperature with methanol which has been saturated with hydrochloric acid gas, salts of 6-bromo-dopa-lower alkyl esters may be formed; the 6-bromo-dopa lower alkyl esters may be precipitated from aqueous solutions of their salts by neutralization with sodium hydrogen carbonate or sodium acetate. The 6-bromo-dopa lower alkyl esters may be acylated to form triacyl derivatives by known methods with carboxylic acid anhydrides or carboxylic acid chlorides.

The position of the bromine atom in the molecule has been determined on the basis of the interpretation of the nuclear magnetic resonance spectrum (herein referred to as the NMR spectrum) of the O,O,N-triacetyl-monobromo-dopa-methyl ester produced from monobromo-dopa by esterification and acylation. The NMR spectrum of this compound shows characteristics indicating aromatic protons in the form of two sharp singlets, each corresponding to one proton. Accordingly, the brominated amino acid only has two hydrogen atoms left in the nucleus. The absence of a cleavage of lines by spin-spin reciprocal action may only be explained when both aromatically linked protons are in the p-position in relation to each other, i.e. they must be located in positions 2 and 5. Only position 6 thus remains for the bromine atom.

Dibromo-dopa derivatives are produced by a process analogous to monobromination, but using two mol equivalents of brominating agent. The position of the second bromine atom introduced in the aromatic nucleus is not certain. It may occupy the 2- or 5-position.

As indicated above, it is also within the scope of the present invention to proceed in such a way that an alkyl ester of dopa is treated with one or two mol equivalents of brominating agent, e.g. bromine in glacial acetic acid or pyridine hydrobromide perbromide in glacial acetic acid or in an alcohol, and the free esters are liberated from the resulting mineral acid salts of 6-bromo- and X,6-dibromo-dopa alkyl ester by neutralization. The esters or their salts may be saponified by heating with dilute mineral acid, whereby mono- and dibromo-dopa result in the form of their salts. The free amino acids may be precipitated from aqueous solutions of these salts in the presence of sulphurous acid by neutralization with sodium hydrogen carbonate or sodium acetate; the purpose of having present sulphurous acid is preventing or minimizing the formation of dark-coloured, resin-like byproducts.

When enantiomeric forms of dopa and dopa alkyl esters are brominated as described herein, the optical activity is not lost. Furthermore, no racemization occurs on saponification of bromo-dopa esters and during acylation reactions under the conditions described herein.

The compounds of Formula I wherein $R_1$ is a hydrogen atom are amphoteric compounds which are crystalline at room temperature; with strong organic or inorganic acids they form relatively stable salts which are crystalline at room temperature.

Examples of acids for acid addition salt formation are hydrochloric, hydrobromic, sulphuric and phosphoric acid.

The compounds of Formula I, wherein $R_1$ is a lower alkyl group, are basic compounds which are crystalline at room temperature; with organic and inorganic acids they form relatively stable salts, which are crystalline at room temperature. Examples of acids for acid addition salt formation are in addition to the acids cited above fumaric, maleic, malic, acetic and tartaric acid.

The compounds of the invention exert an effect which is similar to the effect of dopa, a biogenetic precursor of the known catecholamines, such as 3,4-dihydroxyphenyl-ethyl amine (also referred to as "dopamine"), nor-adrenalin and adrenalin. The compounds of the present invention have a stimulating effect on the central nervous system and therefore influence the blood circulation advantageously. Thus their use is indicated in the treatment of illness involving malfunctions of the central nervous system and/or blood circulation, e.g. psychic disorders and hypertonia.

An alternative or additional use for the compounds of the invention is that of intermediates for the production of pharmaceuticals.

When the compounds of the invention are used as pharmaceuticals, they may be administered as such or in the form of appropriate medicinal preparations for administration, e.g. enterally or parenterally. In order to produce such medicinal preparations, the compounds of the invention are worked up with organic or inorganic adjuvants which are physiologically acceptable and inert. Examples of such adjuvants are:

Tablets and dragees.—Lactose, starch, talc and stearic acid.
Syrups.—Solutions of cane sugar, invert sugar and glucose.
Injectable solutions.—Water, alcohols, glycerin and vegetable oils.
Suppositories.—Natural or hardened oils and waxes.

The preparations may furthermore contain suitable preserving, stabilizing or wetting agents, solubilizers, sweetening and colouring substances or flavourings.

The present invention therefore also provides pharmaceutical compositions containing, in addition to a physiologically acceptable carrier, a Compound I and/or O,O,N-triacyl derivative and/or an acid addition salt thereof.

In the following non-limitative examples all temperatures are indicated in degrees centigrade; Examples 1, 2, 10 and 13 illustrate the bromination. whereas the others illustrate optional steps in the process of the invention.

In the nuclear magnetic resonance spectra (NMR spectra) indicated in the examples, the chemical displacements are shown in δ-values (p.p.m.=parts per million) and are related to tetramethylsilan as reference signal (δ=0). The abbreviations signify: S=singlet, D=doublet. The number of protons determined from the integrated spectrum is indicated in bracket.

Example 1.—6-bromo-DL-dopa 5 cc. of a 1 molar bromine/glacial acetic acid solution is added dropwise to a suspension of 985 mg. of DL-dopa (5 millimols) in 25 cc. of glacial acetic acid at room temperature and the mixture is stirred until a clear, colourless solution results. After a further hour the solution is evaporated to dryness in a vacuum and 6-bromo-DL-dopa-hydrobromide is crystallized from ethyl acetate. Melting point 228° (decomposition); ultraviolet spectrum: maximum at 286 mμ (in water).

*Free amino acid.*—A solution of 1 g. of 6-bromo-DL-dopa-hydrobromide in 5 cc. of dilute sulphurous acid is brought to a pH value of 5.5–6 by the addition of saturated potassium hydrogen carbonate solution and saturated sodium acetate solution. On standing in the refrigerator or on concentrating the solution in a vacuum 6-bromo-DL-dopa, which is difficulty soluble in water, crystallizes. Melting point 230° (decomposition); ultraviolet spectrum: maximum at 286 mμ (in 0.1 N hydrochloric acid).

Example 2.—6-bromo-DL-dopa 1.6 g. of pyridine hydrobromide perbromide (5 millimols) are added to a suspension of 985 mg. of DL-dopa (5 millimols) in 10 cc. of glacial acetic acid at room temperature and the mixture is stirred at room temperature until a clear solution results. After a further 3 hours the solution is evaporated to dryness in a vacuum, the residue is taken up in 10 cc. of dilute sulphurous acid, the solution is neutralized with potassium hydrogen carbonate and sodium acetate solution and concentrated to approximately 10 cc. in a vacuum. After standing for several hours in the refrigerator, the precipitated 6-bromo-DL-dopa is filtered off, washed with cold water and methanol and dried in a vacuum at 100°. The product shows the characteristics indicated in Example 1.

Example 3.—6-bromo-DL-dopa-methyl ester

A suspension of 500 mg. of 6-bromo-DL-dopa (produced in accordance with Example 2) in 10 cc. of methanol is saturated with hydrochloric acid whilst cooling with ice, whereby the substance goes into solution. After standing over night at room temperature, the solution is evaporated to dryness in a vacuum and the resulting hydrochloride of 6-bromo-DL-dopa-methyl ester is crystallized from methanol/ethyl acetate. Melting point 205° (decomposition); ultraviolet spectrum: maximum at 286 mμ (in 0.1 N hydrochloric acid).

Example 4.—6-bromo-DL-dopa-methyl ester

A suspension of 500 mg. of 6-bromo-DL-dopa (produced in accordance with Example 2) in 10 cc. of methanol is saturated with hydrochloric acid gas whilst cooling with ice, whereby the substance goes into solution. After standing over night at room temperature, the solution is evaporated to dryness in a vacuum, the resulting hydrochloride of 6-bromo-DL-dopa-methyl ester is dissolved in dilute sulphurous acid and the acid solution is neutralized with saturated sodium acetate solution. The 6-bromo-DL-dopa-methyl ester, which precipitates on concentrating the solution in a vacuum, is recrystallized from methanol/ethyl acetate. Melting point 168–169° (decomposition); ultraviolet spectrum analogous to that of 6-bromo-DL-dopa.

Example 5.—6-bromo-DL-dopa-methyl ester

Bromination of 1.25 g. of DL-dopa-methyl ester hydrochloride (5 millimols), effected in a manner analogous to that indicated in Example 2 with 5 millimols of pyridine hydrobromide perbromide in glacial acetic acid, after working up yields 6-bromo-DL-dopa-methyl ester, which shows the characteristics indicated in Example 4 after recrystallization from methanol/ethyl acetate.

*Example 6.—6-bromo-DL-dopa*

290 mg. of 6-bromo-DL-dopa-methyl ester (1 millimol; produced in accordance with Example 4 or 5) are stirred together with 5 cc. of 1 N hydrochloric acid over night at 100°, the slightly coloured solution is then concentrated to a small volume in a vacuum, 20 mg. of sodium sulphite are added thereto and the pH value brought to 5.5–6 with saturated sodium acetate solution. After standing for several hours at 5–10°, the 6-bromo-DL-dopa which crystallizes out is filtered off, washed with cold water and methanol and dried in a vacuum at 100°. The product shows the characteristics indicated in Example 1.

*Example 7.—6-bromo-L-dopa*

Bromination of 985 mg. of L-dopa (5 millimols), effected in a manner analogous to that indicated in Example 1, with bromine in glacial acetic acid, after working up yields 6-bromo-L-dopa, which is difficultly soluble in water and which may be obtained in crystalline form after purifying by precipitation from acid solution and neutralization. Melting point 185° (decomposition);

$[\alpha]_D = +8.8°$ (c.=0.5 in 1 N hydrochloric acid); ultraviolet spectrum analogous to that of 6-bromo-DL-dopa.

*Example 8.—6-bromo-L-dopa*

Bromination of 5 millimols of L-dopa, effected in a manner analogous to that indicated in Example 2 with pyridine hydrobromide perbromide in glacial acetic acid, after working up yields 6-bromo-L-dopa with the characteristics indicated in Example 7.

*Example 9.—6-bromo-D-dopa*

Bromination of 985 mg. of D-dopa (5 millimols), effected in a manner analogous to that indicated in Example 1, with bromine in glacial acetic acid, after working up yields 6-bromo-D-dopa, which is difficultly soluble in water and which may be obtained in crystalline form after purifying by precipitation from acid solution and neutralization. Melting point 185° (decomposition);

$[\alpha]_D = -9°$ (c.=0.5 in 1 N hydrochloric acid); ultraviolet spectrum analogous to that of 6-bromo-DL-dopa.

*Example 10.—O,O,N-triacetyl-6-bromo-DL-dopa-methyl ester*

1.6 g. of pyridine hydrobromide perbromide (5 millimols) are added to a suspension of 985 mg. of DL-dopa (5 millimols) in 10 cc. of glacial acetic acid at room temperature and the mixture is stirred at room temperature until a clear solution results. After a further 3 hours, the solution is evaporated to dryness in a vacuum, the residue is taken up in 30 cc. of methanol which has been saturated with hydrochloric acid gas, the solution is evaporated in a vacuum after standing over night, the resulting syrup is acetylated by heating for ½ hour together with 5 cc. of pyridine and 2 cc. of acetic anhydride on a water bath, the reaction product obtained after evaporation of the volatile portions in a vacuum at 100° is taken up in chloroform, the chloroform solution is shaken with 2 N hydrochloric acid, 2 N potassium hydrogen carbonate solution and water, the solution is dried over sodium sulphate and evaporated in a vacuum. O,O,N-triacetyl-6-bromo-DL-dopa-methyl ester crystallizes from ethyl acetate and is purified by recrystallization from the same solvent. Melting point 145–146°; ultraviolet spectrum: maxima at 271 and 278 mμ (in methanol); infrared spectrum: bands at 3400 (NH), 1772 (AcO), 1742 (COOCH$_3$) and 1678 cm.$^{-1}$ (AcN) (in methylene chloride); NMR spectrum: $\delta_{p.p.m.}$=7.44 S (1 H), 7.10 S (1 H), 6.25 D (1 H), 4.90 multiplet (1 H), 3.73 S (3 H), 3.23 D (2 H), 2.28 S (6 H), 1.98 S (3 H) (in deuterochloroform).

*Example 11.—O,O,N-triacetyl-6-bromo-D-dopa-methyl ester*

Bromination of 5 millimols of D-dopa, effected in a manner analogous to that described in Example 10, with 5 millimols of pyridine hydrobromide perbromide in glacial acetic acid, after esterification and acetylation at room temperature yields O,O,N-triacetyl-6-bromo-D-dopa-methyl ester, which crystallizes from isopropanol. Melting point 149–150°; $[\alpha]_D$=—40° (c.=0.5 in chloroform); ultraviolet spectrum (in methanol) and infrared spectrum (in methylene chloride) analogous to that of the DL compound.

*Example 12.—O,O,N-triacetyl-6-bromo-L-dopa methyl ester*

Bromination of 5 millimols of L-dopa, effected in a manner analogous to that described in Example 10 with 5 millimols of pyridine hydrobromide perbromide in glacial acetic acid, after esterification and acetylation at room temperature yields O,O,N-triacetyl-6-bromo-L-dopa-methyl ester which crystallizes from isopropanol. Melting point 149–150°; $[\alpha]_D$=+39° (c.=0.5 in chloroform); ultraviolet and infrared spectrum analogous to that of the DL compound.

*Example 13.—X,6-dibromo-DL-dopa*

10 cc. of a 1 molar bromine/glacial acetic acid solution are added dropwise to a suspension of 985 mg. of DL-dopa (5 millimols) in 25 cc. of glacial acetic acid at room temperature and the mixture is stirred until a clear, almost colourless solution results; it is subsequently heated for 2 hours to 40° and the solvent is then evaporated in a vacuum. The resulting hydrobromide of the dibromo compound is dissolved in dilute sulphurous acid, the solution is brought to a pH value of 5.5–6 with saturated soduim hydrogen carbonate and sodium acetate solution and after several hours the precipitated dibromo-DL-dopa is filtered off, washed with cold water and dried in a vacuum at 100°. Melting point 195° (decomposition); ultraviolet spectrum: maximum at 291 mμ in 0.1 N hydrochloric acid).

*Example 14.—X,6-dibromo-DL-dopa-methyl ester*

A suspension of 300 mg. of X,6-dibromo-DL-dopa (produced in accordance with Example 13) in 10 cc. of methanol is saturated with hydrochloric acid gas whilst cooling with ice, whereby the substance goes into solution. After standing over night at room temperature, the solution is evaporated to dryness in a vacuum and the resulting hydrochloride of X,6-dibromo-DL-dopa-methyl ester is crystallized from methanol/ethyl acetate. Melting point 225° (decomposition); ultraviolet spectrum; maximum at 294 mμ (in methanol); infrared spectrum: characteristic bands at 3440, 3220 and 1740 cm.$^{-1}$ (in Nujol).

*Free base.*—0.5 cc. of 1 N sodium hydrogen carbonate solution are added to a solution of 200 mg. of the hydrochloride obtained above in 2 cc. of water, the precipitated free methylester of X,6-dibromo-DL-dopa is filtered off and crystallized from water. Melting point 174–175° (decomposition).

*Example 15.—O,O,N-triacetyl-X,6-dibromo-DL-dopa-methyl ester*

The X,6-dibromo-DL-dopa-methyl ester described in Example 14 is acetylated by known methods with acetic anhydride in pyridine and the resulting O,O,N-triacetyl-X,6-dibromo-DL-dopa-methyl ester is crystallized from ethyl acetate after filtration in chloroform solution through a column of silica gel. Melting point 146–147°; ultraviolet spectrum: maxima at 276 and 282 mμ (in methanol); infrared spectrum: bands at 3400 (NH), 1776 (OAc), 1740

(COOCH₃) and 1680 (AcN) cm.⁻¹ (in methylene chloride); NMR spectrum: $\delta_{p.p.m.}$=7.55 S (1 H), 6.34 D (1 H), 4.8–5.4 multiplet (1 H), 3.73 S (3 H), 3.58 S (1 H), 3.44 S (1 H), 2.35 S (3 H), 2.28 S (3 H), 1.95 S (3 H).

*Example 16.—X,6-dibromo-L-dopa*

Bromination of 985 mg. of L-dopa (5 millimols), effected in a manner analogous to that described in Example 13, with bromine in glacial acetic acid, after working up yields X,6-dibromo-L-dopa which is difficultly soluble in water and which is purified by reprecipitation from acid solution and neutralization. Melting point 180–185° (decomposition); [α]$_D^{20}$=+25° (in 1 N hydrochloric acid); ultraviolet spectrum: maximum at 291 mμ (0.1 N hydrochloric acid).

*Example 17.—X,6-dibromo-L-dopa-methyl ester*

A suspension of 300 mg. of X,6-dibromo-L-dopa (produced in accordance with Example 16) in 10 cc. of methanol is saturated with hydrochloric acid gas whilst cooling with ice, whereby the substance goes into solution. After standing over night at room temperature, the solution is evaporated to dryness in a vacuum and the hydrochloride of X,6-dibromo-L-dopa-methyl ester is first recrystallized from methanol/ethyl acetate and then from water. Melting point 216–217° (decomposition); [α]$_D^{20}$=+34° (in ethanol); ultraviolet spectrum: maximum at 294 mμ (in methanol); infrared spectrum: characteristic bands at 3440, 3220 and 1740 cm.⁻¹ (in Nujol).

*Free base.*—A solution of 200 mg. of the resulting hydrochloride in 10 cc. of 80% methanol is concentrated in a vacuum to a small volume after the addition of 0.5 cc. of 1 N sodium hydrogen carbonate solution. On standing X,6-dibromo-L-dopa-methyl ester crystallizes. Melting point 191–193° (decomposition).

*Example 18.—O,O,N-triacetyl-X,6-dibromo-L-dopa-methyl ester*

The X,-6-dibromo-L-dopa-methyl ester described in Example 17 is acetylated by known methods with acetic anhydride in pyridine. For purposes of purification the triacetyl derivative is filtered in chloroform solution through a column of silica gel. After evaporation the filtrate crystallizes from ethyl acetate/ether. Melting point 134–135°; [α]$_D^{20}$=+22° (in chloroform). The ultraviolet, infrared and NMR spectra are analogous to those of the corresponding DL compound (Example 15).

What is claimed is:

1. A brominated 3,4-dihydroxyphenylalanine derivative of the formula:

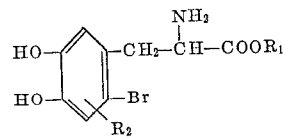

and its O,O,N-triacetyl derivatives, wherein R₁ is a member selected from the group consisting of hydrogen and lower alkyl, and R₂ is a member selected from the group consisting of hydrogen and bromine.

2. 6-bromo-DL-3,4-dihydroxyphenylalanine.
3. 6-bromo-DL-3,4 - dihydroxyphenylalanine - methyl ester.
4. 6-bromo-L-3,4-dihydroxyphenylalanine.
5. 6-bromo-D-3,4-dihydroxyphenylalanine.
6. O,O,N - triacetyl - 6 - bromo - DL - 3,4 - dihydroxyphenylalanine-methyl ester.
7. O,O,N - triacetyl - 6 - bromo - D - 3,4 - dihydroxyphenylalanine-methyl ester.
8. O,O,N - triacetyl - 6 - bromo - L - 3,4 - dihydroxyphenylalanine-methyl ester.
9. The dibromo compound obtained by brominating DL-3,4-dihydroxyphenylalanine in glacial acetic acid at room temperature, heating for 2 hours at 40° C., subjecting to vacuum evaporation, dissolving the resulting product in sulphurous acid, bringing the solution to pH 5.5–6 with sodium hydrogen carbonate and sodium acetate and filtering off the compound which precipitates.
10. The methyl ester of compound of claim 9.
11. The compound obtained by acetylating the methyl ester of claim 10 with acetic anhydride in pyridine.
12. The compound obtained according to claim 9 by replacing the DL-3,4-dihydroxyphenylalanine with L-3,4-dihydroxyphenylalanine.
13. The methyl ester of the compound of claim 12.
14. The compound obtained by acetylating the methyl ester of claim 13 with acetic anhydride in pyridine.

References Cited

UNITED STATES PATENTS 3,046,300   7/1962   Sletzinger _____ 260—471

LORRAINE A. WEINBERGER, *Primary Examiner.*

L. A. THAXTON, *Assistant Examiner.*